US010024545B2

(12) United States Patent
Johncock et al.

(10) Patent No.: US 10,024,545 B2
(45) Date of Patent: Jul. 17, 2018

(54) POWER MANAGEMENT FOR HOME APPLIANCES

(71) Applicant: Whirlpool Corporation, Benton Harbor, MI (US)

(72) Inventors: James C. Johncock, Shelbyville, MI (US); Anthony M. Wickey, Kalamazoo, MI (US); Nathan C. Wier, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 428 days.

(21) Appl. No.: 14/255,007

(22) Filed: Apr. 17, 2014

(65) Prior Publication Data

US 2015/0300651 A1 Oct. 22, 2015

(51) Int. Cl.

| | |
|---|---|
| ***A21B 1/02*** | (2006.01) |
| ***A21B 1/40*** | (2006.01) |
| ***H05B 3/68*** | (2006.01) |
| ***F24C 7/08*** | (2006.01) |
| ***H05B 1/02*** | (2006.01) |

(52) U.S. Cl.

CPC .............. *F24C 7/088* (2013.01); *F24C 7/087* (2013.01); *H05B 1/0263* (2013.01); *H05B 1/0266* (2013.01)

(58) Field of Classification Search

CPC .... A21B 1/00; A21B 1/02; A21B 1/40; H05B 3/00; H05B 3/68; H05B 1/0258–1/0266

USPC ....... 219/395, 396, 397, 398, 399, 400, 401, 219/402, 408, 412, 413, 414, 443.1, 219/457.1, 458.1, 507, 508, 509

See application file for complete search history.

(56) References Cited

U.S. PATENT DOCUMENTS 2,263,420 A 11/1941 Hammell
4,188,528 A 2/1980 Wierzchowski et al.
(Continued)

FOREIGN PATENT DOCUMENTS

EP 0576408 A1 12/1993
EP 1267129 A2 12/2002
(Continued)

OTHER PUBLICATIONS

European Patent Office, European Search Report and Opinion for European Application No. EP15159298.7, dated Aug. 17, 2015 (7 pages).

*Primary Examiner* — Michael Laflame, Jr.
(74) *Attorney, Agent, or Firm* — Price Heneveld LLP

(57) ABSTRACT

The present disclosure includes a system for power management of a plurality of heating sources for an electric range. The system includes a cooktop element, an oven element, and a switch in electrical connection with the cooktop element. The switch is configured to supply a first voltage or a second voltage to the cooktop element from a voltage source. The system further includes a controller in communication with the oven element and configured to control the at least one switch. The controller is configured to control the switch in a first state and a second state. In the first state, the controller controls the switch to supply the first voltage to the cooktop element in response to an off-state of the oven element. In the second state, the controller controls the switch to supply the second voltage to the cooktop element in response to an on-state of the oven element.

14 Claims, 4 Drawing Sheets

(56) References Cited

U.S. PATENT DOCUMENTS

| | | | | | |
|---|---|---|---|---|---|
| 4,663,067 | A * | 5/1987 | Mallow | C09K 17/40 106/900 |
| 5,280,157 | A * | 1/1994 | Hornung | F24C 14/02 219/397 |
| 5,932,128 | A * | 8/1999 | Dishop | H05B 3/262 219/213 |
| 6,157,008 | A | 12/2000 | Brown et al. | |
| 6,479,804 | B2 | 11/2002 | Cho et al. | |
| 6,497,276 | B2 | 12/2002 | Clark et al. | |
| 6,965,100 | B2 | 11/2005 | Kim | |
| 7,420,142 | B2 * | 9/2008 | Barrena | H01H 19/62 219/448.11 |
| 8,541,719 | B2 * | 9/2013 | Steurer | H02J 3/14 219/414 |
| 2002/0189464 | A1 * | 12/2002 | Schneider | H05B 3/746 99/331 |
| 2008/0083729 | A1 * | 4/2008 | Etheredge | F24C 7/087 219/412 |
| 2009/0139980 | A1 | 6/2009 | Acero et al. | |
| 2009/0167085 | A1 | 7/2009 | Fonseca et al. | |
| 2009/0294434 | A1 * | 12/2009 | Fonseca | H05B 1/0263 219/498 |
| 2010/0200565 | A1 * | 8/2010 | Leung | H05B 3/68 219/443.1 |
| 2011/0147366 | A1 * | 6/2011 | Franca | H05B 1/0266 219/443.1 |

FOREIGN PATENT DOCUMENTS

| | | | |
|---|---|---|---|
| FR | 2466047 | A1 | 3/1981 |
| WO | 9529572 | A1 | 11/1995 |

* cited by examiner

POWER MANAGEMENT FOR HOME APPLIANCES

BACKGROUND

The present disclosure relates generally to a system for power management, and particularly refers to a system for power management of an appliance.

SUMMARY

One aspect of the present disclosure includes a system for power management of a plurality of heating sources for an electric range. The system comprises a cooktop element, an oven element, and a switch in electrical connection with the cooktop element. The switch is configured to supply a first voltage or a second voltage to the cooktop element from a voltage source. The system further includes a controller in communication with the oven element and is configured to control the at least one switch. The controller is configured to control the switch in a first state and a second state. In the first state, the controller controls the switch to supply the first voltage to the cooktop element in response to an off-state of the oven element. In the second state, the controller controls the switch to supply the second voltage to the cooktop element in response to an on-state of the oven element.

In another aspect, the present disclosure includes a system for power management of a plurality of heating sources. The system comprises a first heating element, a second heating element, and a controller. The controller is configured to supply a first voltage in a first state to the first heating element in response to a second heating element control state being inactive. The controller is further configured to supply a second voltage in a second state to the first heating element in response to the second heating element control state being active.

In another aspect, the present disclosure includes a controller for power management of a plurality of heating sources for an electric range. The controller is configured to complete various steps including monitoring an oven signal communicating a oven state of an oven element and monitoring a cooktop signal communicating a cooktop state of a cooktop element. The controller is further configured to supply a first voltage to the cooktop element in response to the oven signal communicating the oven state is inactive. The controller is further configured to supply a second voltage to the cooktop element in response to the oven signal communicating an oven state is active and the cooktop signal communicating the cooktop state is active.

These and other features, advantages, and objects of the present device will be further understood and appreciated by those skilled in the art upon studying the following specification, claims, and appended drawings.

DETAILED DESCRIPTION OF EMBODIMENTS

Figure 1:
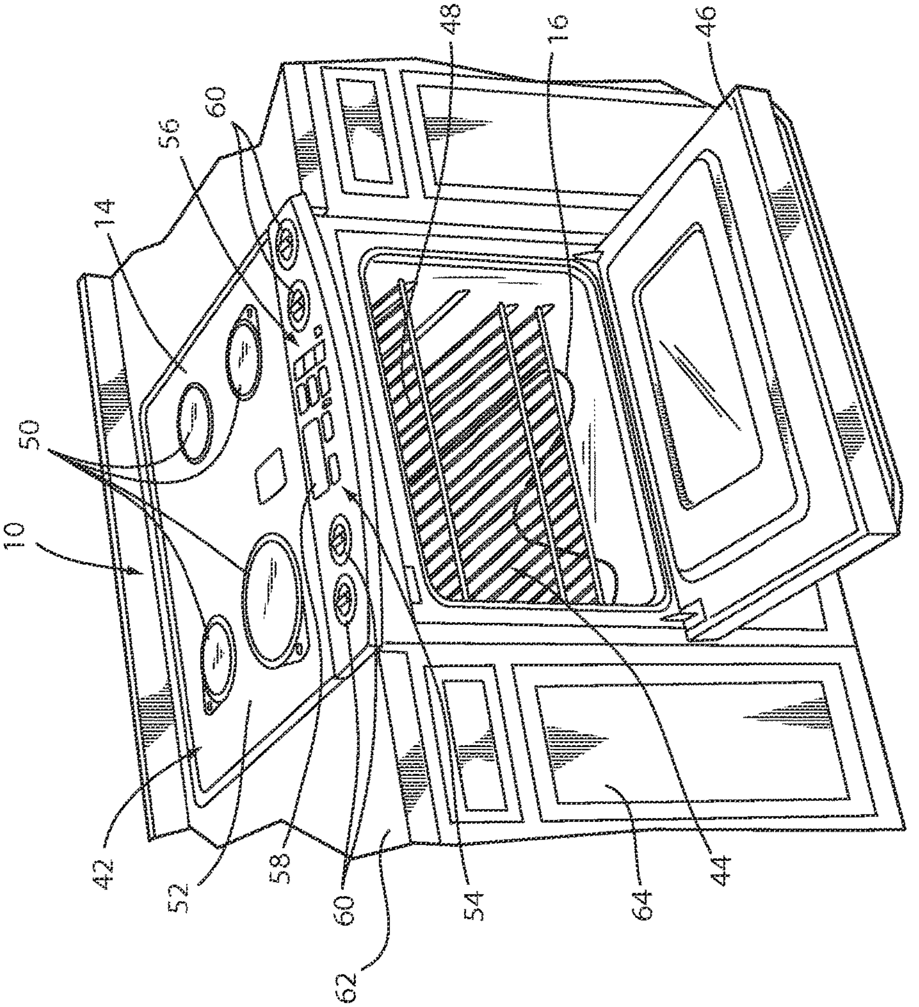
FIG. 1 is an environmental view of a freestanding range including a system for power management.

For purposes of description herein the terms “upper,” “lower,” “right,” “left,” “rear,” “front,” “vertical,” “horizontal,” and derivatives thereof shall relate to the system as oriented in FIG. 1. However, it is to be understood that the device may assume various alternative orientations and step sequences, except where expressly specified to the contrary. It is also to be understood that the specific systems, controllers and processes illustrated in the attached drawings, and described in the following specification are simply exemplary embodiments of the inventive concepts defined in the appended claims. Hence, specific configurations and other physical characteristics relating to the embodiments disclosed herein are not to be considered as limiting, unless the claims expressly state otherwise.

Figure 2:
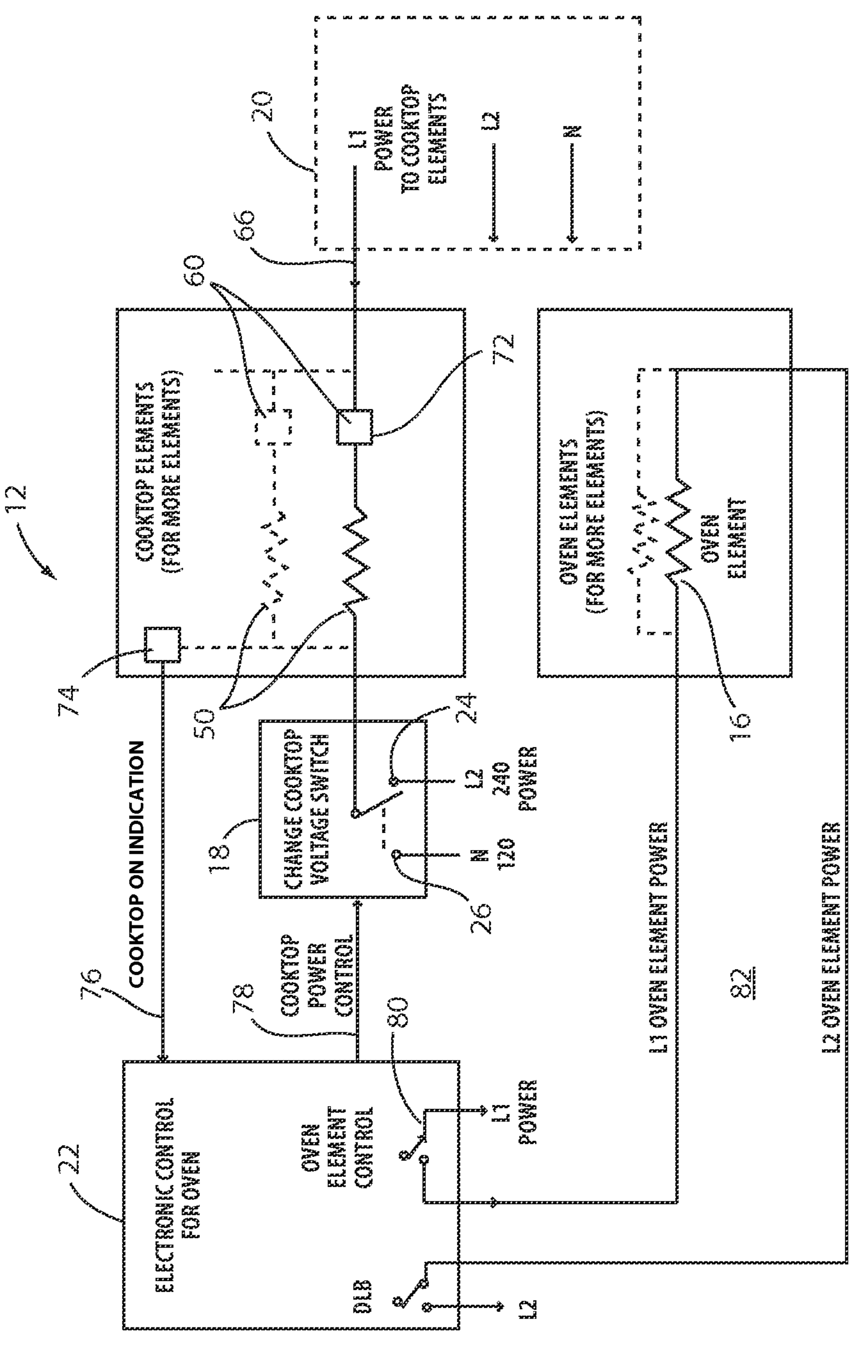
FIG. 2 is a schematic diagram of a system for power management.

Referring to FIGS. 1 and 2, a system for power management of a plurality of heating sources for an electric range is shown in accordance with the disclosure. Reference numeral 10 generally refers to an electric range incorporating a power management system 12. The electric range 10 includes a cooktop element 14 and an oven element 16. A switch 18 is in electrical connection with the cooktop element 14 and configured to supply a first voltage or a second voltage to the cooktop element 14 from a voltage source 20. The system 12 further comprises a controller 22 in communication with the oven element 16, the cooktop element 14, and the switch 18. The controller 22 is configured to position the switch 18 in a first state 24 and a second state 26. In the first state 24, the controller 12 controls the switch 18 to supply the first voltage to the cooktop element 14 in response to an off-state of the oven element 16. In the second state 26, the controller 12 controls the switch 18 to supply the second voltage to the cooktop element 14 in response to an on-state of the oven element 16.

The system 12 provides numerous benefits including limiting the peak power usage of the electric range 10 while maintaining a peak performance of the plurality of cooktop elements 50 or the at least one oven element 16 when operated individually. Though in this example, the system 12 is implemented in the range 10, the system 12 may similarly be implemented to selectively supply the first voltage or the second voltage to a first heating element in response to a state of operation (e.g. active, inactive) of a second heating element. The system may be implemented in various systems that include at least a first and a second heating element.

In reference to the implementation generally illustrated in FIG. 1, the electric range 10 is shown including a cooktop 42 and an oven 44. The oven 44 comprises a door 46 operably coupled to the range 10 and at least one oven element 16 disposed in an oven cavity 48. The cooktop 42 comprises a plurality of cooktop elements 50 including the cooktop element 14. The plurality of cooktop elements 50 are disposed on a cooktop surface 52. The power management system 12 is operable to supply either a first voltage or a second voltage to the at least one cooktop element 14 of the plurality of cooktop elements 50 in response to the operational state of the at least one oven element 16. The elements (e.g. cooktop elements, oven elements) refer to heating elements that may be implemented in various home appliances. Each of the heating elements may correspond to a resistive heating element, inductive heating element, or any other form of heating element configured to operate from a voltage supply. The electric range 10 further comprises a user interface 54 including a plurality of control inputs 56 (e.g. oven controls, timer controls, clock controls, etc.), a display 58, and a plurality of cooktop element controls 60. The electric range 10 is shown in an illustrative environment including a countertop 62 and cabinets 64. The system 12 is configured to control a power supplied to at least one cooktop element from a voltage source in response to the activation of the at least one oven element 16. In some implementations, the system 12 is configured to advantageously control a voltage supplied to the cooktop element 14 to supply a first voltage to the cooktop element 14 in response to the oven element 16 being in an inactive state. The system 12 is further configured to supply a second voltage to the cooktop element 14 in response to the oven element 16 being in an active state.

Referring now to FIGS. 1 and 2, the system 12 is incorporated in the electric range 10 and in communication with the plurality of control inputs 56. The system 12 provides various benefits including managing a power usage of the cooktop elements 50 when at least one cooktop element 14 is active in combination with the at least one oven element 16 during a temporal period. The system 12 is operable to limit the peak power usage of the range 10 by supplying a lower voltage to at least one of the cooktop elements 50 in response to the oven element 16 being active. By reducing the voltage supplied to the plurality of cooktop elements 50, the system 12 is operable to reduce the peak power usage of the range 10 while maintaining the voltage supplied to the oven element 16.

Heating elements as referred to herein may refer to any electrically resistive element or device that may draw power in response to being activated. Activation as referred to herein refers to an on-state and any condition or state in which an electrical device, circuit, or element draws power.

Referring now to FIG. 2, the power management system 12 comprises a controller 22 in communication with the at least one cooktop element 14 and the at least one oven element 16. The controller 22 is operable to detect or control an active or inactive state of the cooktop element 14 and the oven element 16. In some implementations, the at least one cooktop element 14 may comprise a plurality of cooktop elements 50. The cooktop elements 50 are supplied power from a voltage source 20 comprising a first line L1, a second line L2, and a neutral line N. The voltage source 20 may comprise a 3 or 4 line 240V supply line at 60 Hz as typified in wiring standards in the United States. In such implementations, the fourth line may comprise a grounded connection.

Though the voltage source 20 is referred to as a 240V supply line with a frequency of 60 Hz, the voltage source may vary based on a particular voltage supplied in an environment in which the system 12 is implemented. The system 12 may be configured to operate with any voltage standard, for example 230V at 50 Hz, 220V at 50 Hz, etc. Additionally, the system 12 may be configured to operate at different voltages including 480V at 60 Hz, 460V at 50 Hz, 440V at 50 Hz, etc. It shall be understood to those skilled in the art that the various implementations of the system 12, some of which are described herein, may be configured to utilize any voltage source including any alternating current (AC) voltage source.

One of the first line L1 or the second line L2 may supply power to the cooktop element 14 at a first connection 66. A connection from the first line L1 to the second line L2 may provide the first voltage. Similarly a connection from either of the first line L1 or the second line L2 to the neutral line N may provide the second voltage. As shown, the first line L1 is in electrical communication with the cooktop element 14 via a first cooktop control 72 of the cooktop element controls 60. An indicator 74 is in communication with the controller 22 via a cooktop state indication input 76. The indicator 74 is operable to detect and communicate a signal to the controller 22 in response to a control state of the cooktop element 14.

The indicator 74, and other indicators introduced herein, may comprise any device or circuit operable to supply a signal to the controller 22 in response to power being supplied to a heating element. Upon activation of the cooktop element 14, the indicator 74 communicates a signal to the controller 22. In response to the signal, the controller 22 is configured to determine if the cooktop element 14 is active. In response to the cooktop element 14 being active, the controller 22 is configured to activate a power management control for the cooktop element 14. The indicator 74 communicates the control state of the cooktop element 14 to limit unnecessary changes in the switch 18 in response to the oven element 16 being active when the cooktop element 14 is inactive. In some implementations, the controller 22 may function without the indicator 74 and change from the first state 24 to the second state 26 any time that the oven element 16 is active. However, this configuration may cause unnecessary wear on the switch 18.

The switch 18 may comprise any electrical switching device, for example a relay, a 2-way relay, or a plurality of relays, in electrical communication with the cooktop element 14. The switch 18 is further in communication with the controller 22 via a power control output 78 which is configured to selectively activate the first state 24 and the second state 26 of the switch 18. In the first state 24, the switch is in electrical communication with a second line L2 allowing current to flow from the first line L1 through the first cooktop control 72 and the cooktop element 14 to supply a first voltage to the cooktop element 14. As discussed herein, the first voltage may be 240V at 60 Hz. The controller 22 is configured to maintain the switch 18 in the first state 24 in response to the oven element 16 being inactive.

The controller 22 is further configured to activate and control the oven element 16 in response to one or more inputs by a user into the plurality of control inputs 56 as shown in FIG. 1. Similar to most modern ovens, the controller 22 may be operable to activate the oven element 16 via an oven element control 80, for example a relay or switch. The oven element control 80 is configured to supply power to the oven element 16 from the first line L1 and through the second line L2 to form an oven element circuit 82. The oven element circuit 82 may further comprise a double line-break DLB relay that serves as a safety device that is operable to disconnect/short the oven element circuit 82 in response to a fault condition. The fault condition may be detected by the controller 22 in response to an overheating condition or any other safety hazard detected by the controller 22.

In some implementations, the controller 22 is operable to activate the oven element 16 via the oven element control 80. In some implementations, the controller 22 may be in communication with an indicator configured to communicate the operating state of an oven element 16. In either of these implementations, the controller 22 is configured to change the state of the switch 18 from the first state 24 to the second state 26 through the power control output 78 in response to the oven element 16 being configured in an active state and the cooktop state indication input 76 communicating that the cooktop element 14 is also in an active state. In the second state 26, the switch 18 is in electrical communication with the neutral line N and is configured to supply the second voltage (e.g. 120 v) from the first line L1, through the cooktop element 14, and through the neutral line N to complete the circuit in the second state 26.

In operation, the controller 22 is operable to identify a control state or operating state of the plurality of cooktop elements 50 and the oven element 16. During operation of one or more of the cooktop elements 50 during periods when the oven element 16 is inactive or off, the controller 22 maintains the switch 18 in the first state 24 supplying the first voltage to the cooktop elements 50. During operation of the oven element 16 while the cooktop elements 50 are inactive or off, the controller 22 is also configured to maintain the switch 18 in the first state 24. During operation of the cooktop elements 50 while the oven element 16 is active, the controller is configured to change the position of the switch 18 to the second state 26 via the power control output 78. In this way, the power usage of the system 12 is limited by supplying the second voltage (the lower voltage) to the cooktop elements 50 during active operation of both the cooktop elements 50 and the oven element 16.

As described above, the system 12 is operable to limit a peak power consumption of the plurality of cooktop elements 50 and at least one oven element 16. The benefits of the unique configurations and controls, such as the controller 22, provide for maintaining high-performance from a first heating element (e.g. the cooktop element 14) and a second heating element (e.g. the oven element 16) during individual operation of either the first heating element or the second heating element. By supplying a first voltage to the first heating element in a first state and a second voltage to the first heating element in a second state, the controller of a power management system is operable to provide peak performance to the first heating element in response to the second heating element being inactive. This novel approach to controlling the power supplied to at least one heating element of a plurality of heating elements provides for benefits including limiting the peak power consumption of the plurality of heating elements while allowing at least one heating element to be selectively operated at a second voltage. Limiting the peak power consumption of the plurality of heating elements is particularly important to control the power required to operate the plurality heating elements in situations where a power supply may be limited or restricted.

Figure 3:
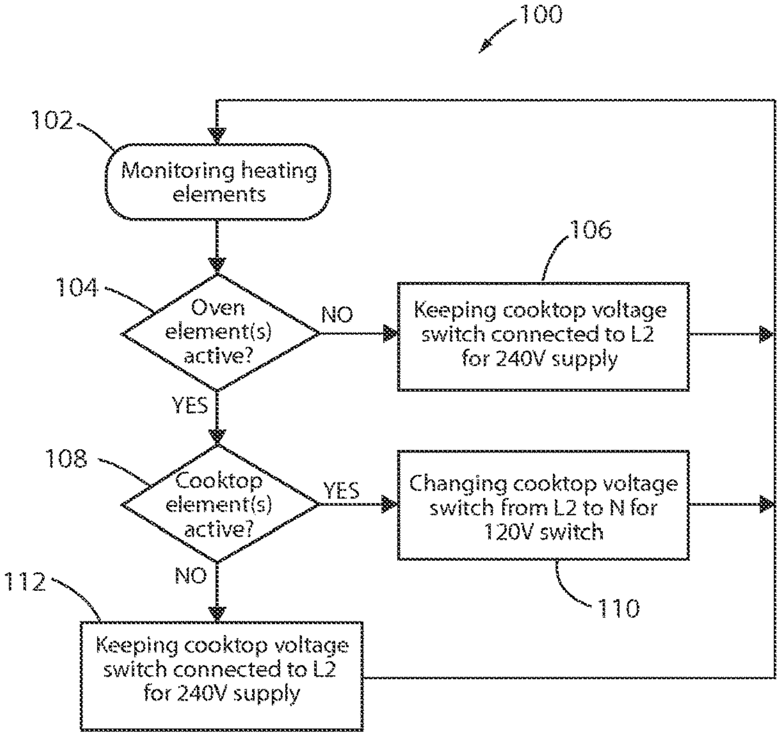
FIG. 3 is a flowchart of a method for control of an appliance implementing a system for power management.

Referring to FIG. 3, a method 100 for operating the cooktop element 14 and the oven element 16 is shown. When activated, the controller 22 monitors the heating elements 50 including the cooktop element 14 and the oven element 16 (102). The controller 22 monitors and/or controls the operating state of the oven element 16 to determine if the oven element 16 is active (104). If the controller 22 identifies that the oven element 16 is not active, the controller 22 is configured to control the position the switch 18 to activate the first state 24. With the switch 18 is positioned in the first state 24 the cooktop element 14 is in electrical connection with the second line L2 to supply the first voltage (e.g. 240V) to the cooktop element 14 (106). Following step 106, the controller 22 is configured to continue monitoring the heating elements by returning to step 102.

If the controller 22 identifies that the oven element is active in step 104, the controller is further configured to determine if the cooktop element 14 is active (108). If the cooktop element 14 is active, the controller 22 is configured to control the position of the switch 18 to activate the second state 26 by changing the connection of the switch 18 from the second line L2 to the neutral line N (110). In the second state 26, the cooktop element 14 is in electrical connection with the neutral line to supply the second voltage (e.g. 120V) to the cooktop element 14. If the cooktop element 14 is inactive, the controller 22 is configured to maintain the first state 24 of the switch 18 (112). The first state 24 of the switch may comprise an initial state or a resting state of the switch 18 during operation of the system 12. Following either of steps 110 or 112, the controller is configured to continue monitoring the heating elements 14, 16 by returning to step 102.

In various implementations of the system 12, the controller 22 may comprise at least one circuit or processor configured to monitor and control the various inputs, outputs, switches and/or relays to accomplish the steps listed herein. In some implementations, the controller 22 may further be configured to receive inputs corresponding to the control inputs 56 to control various timing and temperature related processes to control the oven element 16 and/or the plurality of cooktop elements 14. Such processes may include maintaining and controlling temperature, preheating, timed cooking, timers, alarms and other various cooking controls related to cooktops, ovens, freestanding ranges, and other home appliances. The at least one circuit or processor of controller 22 may be configured as a logic controller that may further be in communication with a memory. The memory may be configured to store and provide access to one or more programmable operations that may be referenced by the at least one circuit or processor to implement the steps discussed herein, including the method 150 discussed herein in reference to FIG. 5.

Figure 4:
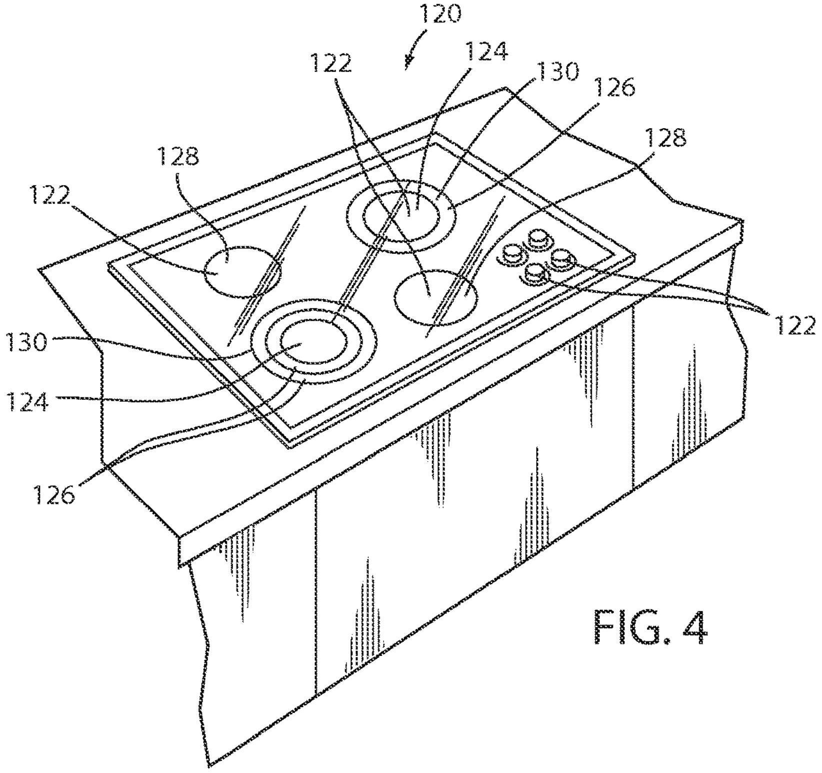
FIG. 4 is an environmental view of a cooktop including a system for power management.

Referring to FIG. 4, the system 12 is similarly implemented in a cooktop 120 comprising a plurality of heating elements 122. One or more of the heating elements 122 may include a primary heating element 124 and at least one secondary heating element 126. Each of the heating elements 122 may correspond to a resistive heating element, inductive element or any other form of heating element configured to operate from a voltage supply. The cooktop 120 further includes a plurality of cooktop element controls 126 configured to control a power supplied to each of the plurality of heating elements 122.

In this implementation, the system 12 may be in communication with each of the heating elements 122 and configured to identify and distinguish whether each of heating elements 122, including the primary heating elements 124 and the secondary elements 126, is in an active state. In order to detect or identify if each of the heating elements 122 is active or inactive, a controller (similar to the controller 22) may be in communication with a plurality of indicators operable to communicate a state of operation (active/inactive, ON/OFF) of each of the heating elements 122. In this configuration, the controller is configured to detect and distinguish if one or more of the heating elements 122 are active. In response to the detection of at least one heating element in an active state, the controller is configured to control a switch to supply a first or a second voltage to a first plurality of heating elements 128 or a second of heating elements 130.

In some implementations, the first plurality of heating elements 128 are supplied a first voltage (e.g. 240V) from a voltage source in response to the second plurality of heating elements 130 being in an inactive state. To supply the first voltage to the first plurality of heating elements 128, the controller is configured to control a position of a switch to a first state. In the first state, power is supplied to the first plurality of heating elements 128 from a first line of a voltage source to a second line of the voltage source to supply the first voltage to the first plurality of heating elements. The second plurality of heating elements 130 may be supplied the first voltage during either of an active or inactive condition of the first plurality of heating elements 128 detected by the controller.

The controller is configured to lower the voltage supplied to the first plurality of cooktop elements 128 in response to at least one of the second cooktop elements 130 being detected in an active state. That is, if at least one of the first plurality of heating elements 128 is detected by the controller in an active state and at least one of the second plurality of heating elements 130 is detected in an active state, the controller is configured to control the position of the switch to a second state. In the second state the switch supplies the second voltage to the first plurality of heating elements 128. In the second state, the switch is configured to supply power to the first plurality of heating elements 128 from the first line of the voltage source to a neutral line of the voltage source.

The cooktop 120 provides similar advantages to the freestanding range 10 introduced in reference to FIG. 1 in that the cooktop 120 includes the system 12 to limit a peak power consumption of the cooktop 120. Further, as demonstrated in this example, the system 12 may be implemented to control a peak power consumption of a variety of devices and systems comprising a plurality of heating elements. Though in this example the first plurality of heating elements 128 and the second plurality of heating elements 130 each refer to a set of two heating elements, a controller implemented similar to the system 12 may be configured to control the power supplied to any heating element or a portion of a heating element. For example, the controller may be configured to supply the primary heating element 124, the second voltage in response to a detection of at least one heating element of a plurality of heating elements being active.

The systems, controllers, and methods discussed herein may further provide for multiple switches, similar to the switch 18, to be controlled by one or more controllers (e.g. the controller 22) to selectively supply a first voltage or a second voltage to one or more heating elements of any number of heating elements. Such systems may be implemented by identifying one or more indications of at least one heating element of a first plurality of heating elements in an active state. The controller may further be operable to detect at least one heating element of a second plurality of heating elements in an active state. In response to at least one of the second heating elements being active, the controller may control a first switch of a plurality of switches or relays to provide a first or second voltage to at least one of the first plurality of heating elements. Further, in response to an indication of one of the first and one of the second pluralities of heating elements being in an active state, the controller may be operable to control a second switch of the plurality of switches or relays to provide a first or second voltage to at least a third heating element.

By implementing a controller configured to detect at least one heating element in an active state of a first plurality of heating elements and a second plurality of heating elements, the systems and methods discussed herein provide for a flexible architecture that is operable to limit a peak power consumption of a wide variety of systems and devices comprising a plurality of heating elements. Additional benefits of the flexible architecture as described herein include limiting the peak power consumption of a system based on states of operation corresponding to at least a first and a second heating element. In response to each of the states of operation, a controller may be configured to selectively supply a first voltage or a second voltage to the first or second heating elements.

Figure 5:
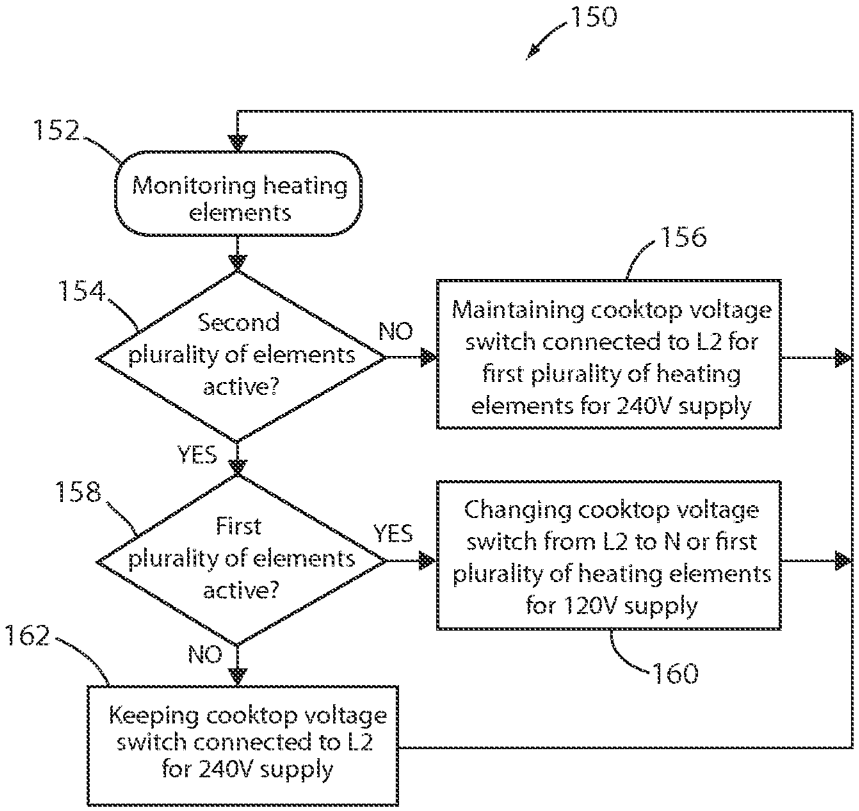
FIG. 5 is a flowchart of a method for control of an appliance implementing a system for power management in accordance with the disclosure.

Referring now to FIGS. 4 and 5, a method 154 for operating the cooktop 120 is shown. As discussed herein, a controller, similar to controller 22, is configured to monitor an operating state of the plurality of heating elements 122 (152). In operation, the controller determines if one of the second plurality of heating elements 130 is active (154). If the controller identifies that the second plurality of heating elements 130 is inactive, the controller is configured to control the position of a switch to activate or maintain a first state. In the first state, the first plurality of heating elements 128 is in electrical connection with the first line L1 and the second line L2 to supply the first voltage (e.g. 240V) to the first plurality of heating elements 128 (156). Following step 156, the controller is configured to continue monitoring the heating elements 122 by returning to step 152.

If the controller identifies that at least one of the second plurality of heating elements 130 is active, the controller is further configured to determine if at least one of the first plurality of elements 128 is active (158). If at least one of the first plurality of heating elements 128 is active, the controller is configured to control the position of the switch to activate the second state by changing the connection of the switch from the second line L2 to the neutral line N (160). In the second state, the first heating elements 128 are in electrical connection with the first line L1 and the neutral line N to supply the second voltage (e.g. 120V) to the first plurality of heating elements 128. If the first plurality of heating elements 128 is inactive, the controller is configured to maintain the first state of the switch (152). Following either of steps 150 or 152, the controller is configured to continue monitoring the heating elements 122 by returning to step 152.

The various implementations of the systems and methods discussed herein provide for various benefits including limiting the peak power consumption of a device or system comprising a plurality of heating elements. Though the systems discussed are in reference to particular implementations of cooktops, ovens, and freestanding ranges, the teachings of this disclosure may be applied to any system comprising a plurality of heating elements or components of appliances that consume energy. The particular implementations of systems discussed herein provide for exemplary implementations and should not be considered to limit the teachings of the disclosure to any particular embodiment. The various systems and methods discussed herein provide various novel approaches to limit a peak power consumption by changing a voltage supplied to at least one component of the appliance.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A system for power management of a plurality of heating sources for an electric range, the system comprising:

a cooktop element comprising an indicator circuit configured to communicate an activation signal;

an oven element;

a switch in electrical connection with the cooktop element and configured to supply a first voltage or a second voltage to the cooktop element from a voltage source; and a controller in communication with the oven element and the indicator circuit, wherein the controller is configured to control the switch, the controller being operable between:

a first state, wherein the controller controls the switch to supply the first voltage to the cooktop element in response to an off-state of the oven element; and a second state, wherein the controller controls the switch to supply the second voltage to the cooktop element in response to an on-state of the oven element and the activation signal communicating that the cooktop element is active.

2. The system according to claim 1, wherein the first voltage is greater than the second voltage.

3. The system according to claim 1, wherein the voltage supply comprises a first line, a second line, and a neutral line, the first line being in electrical connection with the cooktop element.

4. The system according to claim 3, wherein the controller is further operable to supply the first voltage to the cooktop by controlling the switch to connect to the second line in the first state.

5. The system according to claim 3, wherein the controller is further operable to supply the second voltage the cooktop element by controlling the switch to connect to the neutral line in the second state.

6. The system according to claim 1, wherein the first voltage is approximately 240v and the second voltage is approximately 120V.

7. A system for power management of a plurality of heating sources, the system comprising:

a first heating element corresponding to a cooktop element;

a second heating element corresponding to an oven element; and a controller configured to:

detect an activation signal identifying that the cooktop element is active;

supply a first voltage in a first state to the first heating element in response to a second heating element control state being inactive; and supply a second voltage in a second state to the first heating element in response to a combination of receiving the activation signal and the second heating element control state being active.

8. The system according to claim 7, wherein the first voltage is supplied to the second heating element in either of the first state or the second state.

9. The system according to claim 7, wherein the first voltage is greater than the second voltage.

10. The system according to claim 7, further comprising:

an indicator circuit in communication with the controller, wherein the indicator circuit is operable to communicate the state of the second element to the controller.

11. The system according to claim 7, further comprising:

a switch in electrical communication with the first heating element and the controller.

12. The system according to claim 11, wherein the controller is further configured to control the switch to supply the first voltage to the first heating element in the first state and the second voltage to the first heating element in the second state.

13. The system according to claim 7, further comprising a switch configured to selectively supply the second voltage in the second state to the first heating element.

14. The system according to claim 13, wherein the controller is further operable to prevent wear to the switch by supplying the second voltage to the first heating element in response to the combination of receiving the activation signal and the second heating element control state being active.

* * * * *